United States Patent [19]

Yeh et al.

[11] Patent Number: 5,492,176

[45] Date of Patent: Feb. 20, 1996

[54] METHOD FOR TREATING FORMATIONS TO PLUG FLOW

[75] Inventors: Charles S. Yeh, Plano; E. Thomas Strom, Dallas; Larry L. Cox, Carrollton, all of Tex.

[73] Assignee: Mobil Oil Corporation, Fairfax, Va.

[21] Appl. No.: 347,935

[22] Filed: Dec. 1, 1994

[51] Int. Cl.[6] .................................................. E21B 33/138
[52] U.S. Cl. ................................................ 166/295; 166/300
[58] Field of Search ...................................... 166/270, 288, 166/294, 295, 300

[56] References Cited

U.S. PATENT DOCUMENTS

| | | | |
|---|---|---|---|
| 3,601,195 | 8/1971 | Hearn | 166/288 |
| 3,645,336 | 2/1971 | Young et al. | 166/288 |
| 4,600,057 | 7/1986 | Borchardt | 166/295 |
| 4,722,397 | 2/1988 | Sydansk et al. | 166/295 |
| 4,834,182 | 5/1988 | Shu et al. | 166/295 |
| 4,921,047 | 5/1990 | Summers et al. | 166/295 X |
| 4,940,091 | 7/1990 | Shu et al. | 166/270 |
| 4,972,906 | 11/1990 | McDaniel | 166/295 X |
| 5,022,466 | 6/1991 | Shu et al. | 166/263 |
| 5,071,890 | 12/1991 | Shu et al. | 523/130 |
| 5,088,555 | 2/1991 | Shu | 166/292 |
| 5,211,235 | 5/1993 | Shu et al. | 166/270 |
| 5,215,147 | 6/1993 | Grego et al. | 166/270 |
| 5,307,874 | 5/1994 | Lowther | 166/288 |

OTHER PUBLICATIONS

"Impact of Permeability and Lithology on Gel Performance", R. S. Seright; SPE/DOE 24190; Tulsa, OK. Apr. 22–24, 1992.

"Gel Placement in Heterogeneous Systems with Crossflow"; K. S. Sorbie et al. SPE/DOE 24192; Society of Petr. Engr.; Tulsa, OK; Apr. 22–24, 1992.

"A New Gelation Technology for In–Depth Placement of $Cr^{+3}$/Polymer Gels in High–Temperature Reservoirs", T. P. Lockhart et al; SPE/DOE 24194 Society of Petr. Engr.; Tulsa, OK; Apr. 22–24, 1992.

*Primary Examiner*—George A. Suchfield
*Attorney, Agent, or Firm*—Alexander J. McKillop; George W. Hager, Jr.

[57] ABSTRACT

A method for plugging a zone of a subterranean formation to block flow therethrough. A specific plugging solution comprised of an allyl monomer and an initiator is injected into the zone where it is allowed to set at an elevated temperature to harden and form a flow-blocking solid. The allyl monomer is an allyl ester selected from the group of diallyl orthophthalate, diallyl isophthalate, diallyl terephthalate, diallyl benzenephosphonate, diethylene glycol bis(allyl carbonate) and other known allyl monomers and the initiator is preferably a peroxy compound (e.g. benzoyl peroxide, diisopropyl peroxydicarbonate, etc.) or an azo compound (e.g. 4,4'-azobis(4-cyanovaleric acid). A diluent such as an alcohol (e.g. isopropyl alcohol or isobutyl alcohol) or a mutual solvent (e.g. ethylene glycol monobutyl ether, diacetin, triacetin, acetone, etc.) and a coupling agent (e.g. an organofunctional silane) may be added if needed.

17 Claims, No Drawings

METHOD FOR TREATING FORMATIONS TO PLUG FLOW

DESCRIPTION

1. Technical Field

The present invention relates to a method for treating subterannean formations and in one of its aspects relates to a method for treating a subterranean formation to alter the flow profile therethrough by injecting a thermosetting, allyl monomer solution into selected zones of the formation where it hardens in situ to plug or alter flow through these zones.

2. Background

In producing hydrocarbons (e.g. crude oil) and the like from a subterranean formation(s) through a wellbore, it is often necessary to treat the formation(s) to alter the natural flow profile therethrough. That is, certain formations may include highly permeable zones within or adjacent to which need to be "plugged" in order to keep fluids from flowing into or out of these zones during the completion and/or production from those formations.

Further, in "secondary recovery" operations, highly permeable zones are sometimes "plugged" to prevent early "break-through" at the producing wells, i.e. the drive fluid (water, gas, steam, etc.) follows the path of least resistance and channels through the premeable zones thereby by-passing the less permeable zones which normally contain substantial amounts of unrecovered hydrocarbons.

Still further, many producing formations or production intervals have unwanted gas and/or water producing zones which lie above, under, and/or intermediate within the formation. In such formations, it is desirable, if not absolutely necessary, to block off or plug the flow from these zones into the wellbore in order to prevent the production of excessive gas and/or water with the desired production fluids.

There are many known methods for modifying the flow profile through a subterranean formation which all involve plugging the pore spaces of the more permeable zones of the formation at or near the wellbore to block flow from or into these selected zones. Basically, these methods involve injecting a solution of a plugging agent through the wellbore and into the selected permeable zones where it is allowed to set to solidify to form a flow-blocking material in the pores spaces at and/or near the face of the wellbore.

A wide range of plugging agents have been proposed or actually used in these methods to plug selected zones of a subterranean formation to block flow therethrough. These agents include: (a) thermosetting resins which set at elevated temperatures, i.e. heating, and gums which set at lower temperatures, i.e. cooling, see U.S. Pat. No. 3,601,195; (b) silicates, see 3,645,336; (c) gelatin see 5,307,847; (d) aqueous, gel-forming polymers, see 4,722,397 and articles (1) "Impact of Permeability and Lithology on Gel Performance", R. S. Seright et al, (SPE/DOE 24190); (2) "Gel Placement in Heterogeneous Systems with Crossflow", K. S. Sorbie, (SPE/DOE 24192); and (3) "A New Gelation Technology for In-Depth Placement of $Cr^{+3}$/Polymer Gels in High-Temperature Reservoirs, T. P. Lockhart et al, (SPE/DOE 24194), all of which were presented at the SPE/DOE Eighth Symposium of Enhanced Oil Recovery, Tulsa, Okla., Apr. 22–24, 1992).

The present invention provides a method using still another plugging agent which is capable of being placed into the pore space of selected zones adjacent to or within the formation and which will, when allowed to set at the elevated temperature of the formation, will harden or solidify to produce a strongly-bonded material which is substantially insoluble in the formation fluids, thereby blocking flow of fluids through the treated zones.

SUMMARY OF THE INVENTION

The present invention provides a method for treating a selected zone which lies adjacent to or within a subterranean formation to plug pore spaces within the selected zone to block flow therethrough. In the present method, a specific plugging solution comprised of an allyl monomer and an initiator is injected through a wellbore which traverses the selected zone an into the zone where it is allowed to set for a prescribed time in order to allow the solution to polymerize and form a flow-blocking solid with in the pore spaces of the treated zone.

The allyl monomer used to form the present plugging solution is an allyl ester selected from the group of diallyl orthophthalate, diallyl isophthalate, diallyl terephthalate, diallyl benzenephosphonate, diethylene glycol bis(allyl carbonate) and other known allyl monomers. The initiator is preferably a peroxy compound (e.g. benzoyl peroxide, diisopropyl peroxydicarbonate, etc.) or an azo compound (e.g. 4,4'-azobis(4-cyanovaleric acid).

The actual composition of a plugging solution in accordance with the present invention will be basically predicated on the temperature of the selected zone which is to be treated. The solution will have to be liquid and readily pumpable at ambient temperature and be capable of polymerization (i.e. hardening) at the temperature within the selected zone. In some instances, a diluent may be added to assure these characteristics. The diluent may be an alcohol (e.g. isopropyl alcohol or isobutyl alcohol) or a mutual solvent (e.g. ethylene glycol monobutyl ether, diacetin, triacetin, acetone, etc.).

The mixing of the allyl monomers, initiator, and diluent results in a homogeneous and readily pumpable solution which will remain stable at ambient temperatures but will polymerize and harden at the elevated temperatures in the selected subterranean zone into which it is injected. The plugging solution is allowed to set in the selected zone for a prescribed curing time which may range from hours to days, depending on the chemical composition of the plugging solution and the temperature in the selected zone.

Where extra bonding strength may be required, a coupling agent (e.g. an organofunctional silane) may be added to the plugging solution. Further, in carrying out the present method, the selected zone may be pretreated by injecting a pretreating fluid (e.g. a mutual solvent such as named above ) to prepare the surfaces of the sand grains prior to the injection of the plugging solution. Also, a mutual solvent may be circulated through the injection tubing in the wellbore to displace and/or remove the plugging solution from the wellbore after the desired volume of plugging solution has been injected into the zone to be treated.

BEST KNOWN MODE FOR CARRYING OUT INVENTION

In accordance with the present invention, a method is provided for treating a selected zone which lies adjacent to or within a subterranean formation to plug pore spaces within the selected zone to block flow therethrough. In the present method, a specific plugging solution comprised of an allyl monomer and an initiator is injected through a wellbore which traverses the selected zone an into the zone where it is allowed to set for a prescribed time in order to allow the solution to polymerize and form a flow-blocking solid with in the pore spaces of the treated zone.

The "selected zone" to be treated in accordance with the present invention may be any permeable zone which lies adjacent to or within a subterranean formation; i.e. a gas cap zone above a producing formation or a aquifer which lies below or a gas and/or water producing zone intermediate the producing formation.

The specific plugging solution of the present invention is comprised of an allyl monomer and an initiator. The allyl monomer is an allyl ester selected from the group of diallyl orthophthalate, diallyl isophthalate, diallyl terephthalate, diallyl benzenephosphonate, diethylene glycol bis (allyl carbonate) and other known allyl monomers. Most of these allyl monomers are commerically available, e.g. diethylene glycol bis(allyl carbonate) is available under the trademark "CR-39" Monomer, from PPG Industries, Pittsburg, Pa.

The initiator is preferably a peroxy compound (e.g. benzoyl peroxide, diisopropyl peroxydicarbonate, etc.) or an azo compound (e.g. 4,4'-azobis(4-cyanovaleric acid). The polymerization of the allyl ester with the initiator can begin with an allyl monomer, allyl oligomer, or any combination thereof. In addition, copolymerization is possible if the above-identified diallyl compounds are mixed with a monoallyl compound (e.g. allyl benzoate).

The actual composition of a plugging solution in accordance with the present invention will be basically predicated on the temperature of the selected zone which is to be treated. The solution will have to be liquid and readily pumpable at ambient temperature and be capable of polymerization (i.e. hardening) at the temperature within the selected zone. In some instances, a diluent may be added to adjust the characteristics of the plugging solution to those required for a particular situation.

The diluent may be an alcohol (e.g. isopropyl alcohol or isobutyl alcohol) or a mutual solvent (e.g. ethylene glycol monobutyl ether, diacetin, triacetin, acetone, etc.). As pointed out above, the actual composition of a particular plugging solution may vary depending on ambient and formation temperatures, setting times, formation fluids, etc. but the weight percentages will be in the following ranges:

allyl monomers: about 78% to about 99% initator: about 0.5% to about 10% diluent: 0% to about 20%

The mixing of the allyl monomers, initiator, and diluent results in a homogeneous and readily pumpable solution which will remain stable at ambient temperatures but will polymerize at the elevated temperatures in the selected subterranean zone into which it is injected. As the temperature of the plugging solution rises, the solution becomes more viscous until it hardens into an impermeable, solid mass which blocks flow through the treated zone. The plugging solution is allowed to set in the selected zone for a prescribed curing time which may range from hours to days, depending on the chemical composition of the plugging solution and the temperature in the selected zone.

Where extra strength may be required, a coupling agent (e.g. an organofunctional silane) may be added to the plugging solution in a weight concentration of about 5% or less. The coupling agent will enhance the bonding strength between the inorganic sand in the treated zone and the organic allyl polymers so that water and/or gas cannot flow between the sand and the blocking material and thereby alleviating the possibility of reestablishing flow paths through the treated zone.

In carrying out the present method, the selected zone may be pretreated by injecting a pretreating fluid (e.g. a mutual solvent) to prepare the surfaces of the sand grains before injecting the plugging solution. Also, in order to keep the plugging solution from hardening in the wellbore, i.e. injection tubing, a mutual solvent (see examples set forth above ) is circulated through the well tubing to displace and/or remove the plugging solution from the wellbore after the desired volume of plugging solution has been injected into the zone to be treated.

To further illustrate the present invention, the following example is set forth:

A plugging solution was formed by mixing 98 parts by weight of an allyl monomer (i.e. diethylene glycol bis(allyl carbonate) ) with 2 parts of an initiator (i.e. benzoyl peroxide) at room temperature. 0.4% by weight of a coupling agent (i.e. γ-ethacryloxypropyltrimethoxysilane) was added to the plugging solution which was then injected into a 100 U.S. mesh sand pack at 73° C. and was allowed to set at this elevated temperature for 24 hours. The permeability of the sand pack was reduced to approximately 0.15% of its original permeability, i.e dropped from an original permeability of 10,000 millidarcies to a final permeability of 15 millidarcies. The permeability remained the same after the sand pack was exposed to water injection at 73° C. for four days.

What is claimed is:

1. A method for treating a selected zone adjacent to or within a subterranean formation to plug said selected zone to block fluid flow therethrough wherein a wellbore traverses said selected zone, said method comprising:

injecting an plugging solution through said wellbore into said selected zone; said plugging solution being stable and pumpable at ambient temperature, said plugging solution comprising:

an allyl monomer and an initiator;

allowing said plugging solution to set within said selected zone for a prescribed time period, said plugging solution polymerizing at the elevated temperature within said selected zone wherein said plugging solution hardens to form a flow-blocking solid within said zone.

2. The method of claim 1 wherein said allyl monomer comprises:

an allyl ester.

3. The method of claim 2 wherein said allyl ester is selected from the group of diallyl benzenephosphonate, diallyl orthophthalate, diallyl isophthalate, diallyl terephthalate, and diethylene glycol bis(allyl carbonate).

4. The method of claim 2 wherein said initiator comprises:

a peroxy compound.

5. The method of claim 4 wherein said peroxy compound is selected from the group of benzoyl peroxide and diisopropyl peroxydicarbonate.

6. The method of claim 2 wherein said initiator comprises:

an azo compound.

7. The method of claim 6 wherein said azo compound comprises:

4,4'-azobis(4-cyanovaleric acid).

8. The method of claim 1 wherein said plugging solution includes a diluent.

9. The method of claim 8 wherein said diluent is an alcohol.

10. The method of claim 9 wherein said alcohol is selected from the group of isopropyl alcohol and isobutyl alcohol.

11. The method of claim 8 wherein said diluent is a mutual solvent.

12. The method of claim 8 wherein said mutual solvent is selected from the group of ethylene glycol monobutyl ether, diacetin, triacetin, and acetone.

13. The method of claim 8 wherein said plugging solution is comprised of:

about 78% to about 99%, by weight, of said allyl monomer;

about 0.5 to about 10%, by weight, of said initiator; and

0% to about 20% of said diluent.

14. The method of claim 8 wherein said plugging solution includes a coupling agent to enhance the bonding strength of said plugging solution when hardened.

15. The method of claim 14 wherein said coupling agent comprises an organofunctional silane.

16. The method of claim 13 wherein said coupling agent forms less than about 5%, by weight, of said plugging solution.

17. The method of claim 1 including:

circulating a solvent through said wellbore after said plugging solution has been injected into said selected zone to remove plugging solution from the wellbore.

* * * * *